C. L. BEST.
AUTOTRACTOR.
APPLICATION FILED JUNE 25, 1912.
1,084,062. Patented Jan. 13, 1914.
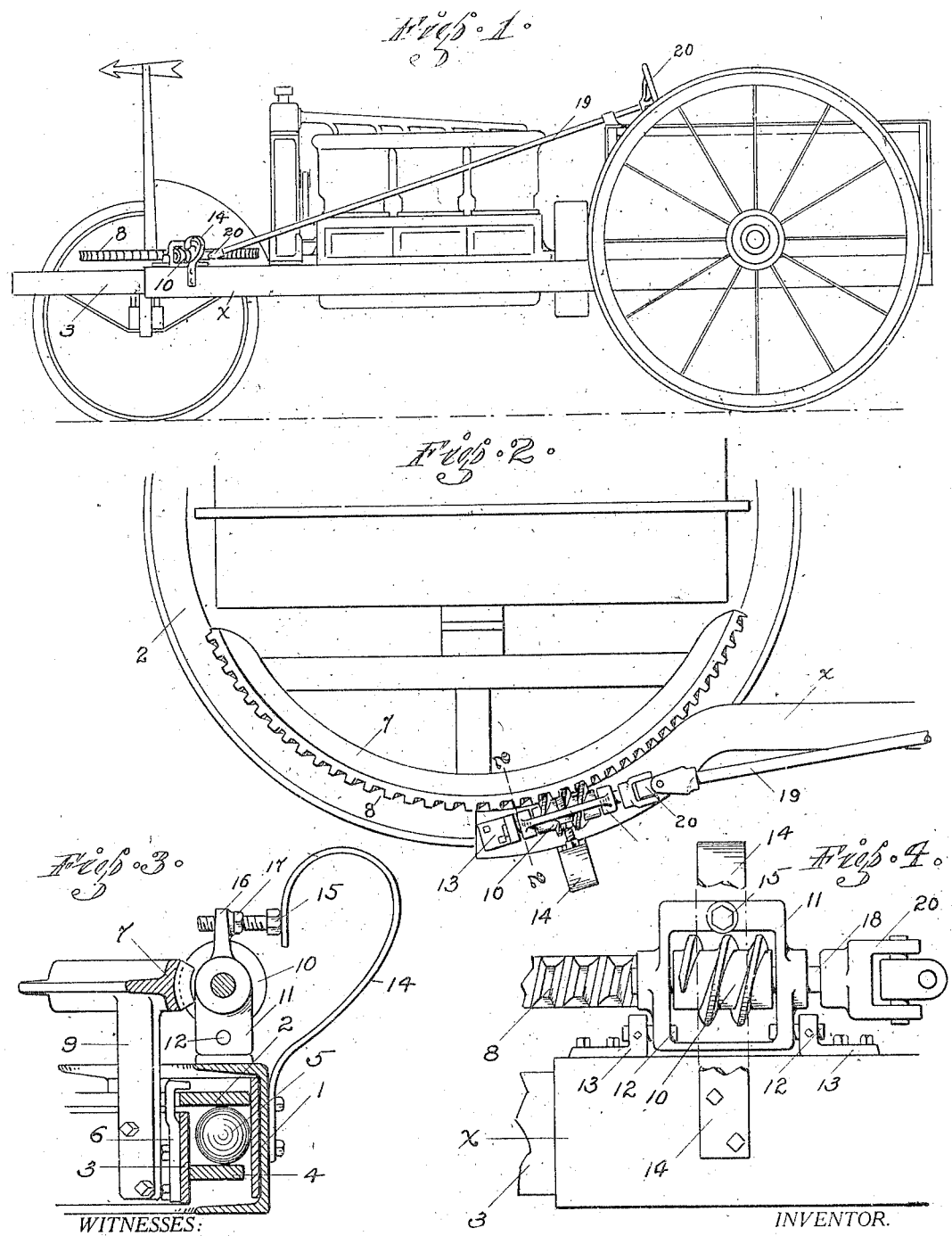
WITNESSES:
INVENTOR.
Clarence L. Best
BY
Baldwin Vale
ATTORNEY.

UNITED STATES PATENT OFFICE.

CLARENCE L. BEST, OF SAN LEANDRO, CALIFORNIA.

AUTOTRACTOR.

1,084,062.  Specification of Letters Patent.  Patented Jan. 13, 1914.

Application filed June 25, 1912. Serial No. 705,722.

*To all whom it may concern:*

Be it known that I, CLARENCE L. BEST, a resident of the city of San Leandro, county of Alameda, and State of California, have invented new and useful Improvements in Autotractors, of which the following is a specification.

This invention relates to improvements in auto-tractors, and particularly to the steering mechanism thereof.

The objects sought to be accomplished are to provide a steering gear, wherein the rotation of the steering column is transmitted directly to the turntable of the pilot wheel with the minimum number of interposed parts; and to provide compensation for irregularity or eccentricity of the turntable in revolving about its vertical axis.

Broadly the invention consists of a turntable comprising an angular concentric ring with an inturned flange and fixed to the front of the tractor main frame; and a concentric angular ring with an outwardly extended flange coöperating with the first mentioned ring to form an annular ball race, with interposed balls therein. The pilot wheel is journaled upon a horizontal axis, mounted within the last named ring. A segment having worm gear teeth in its periphery is fixed to the rotatable ring. A worm gear is horizontally pivoted on the fixed ring gear on the tractor main frame and enmeshed with the segment. The pivotal swing of the worm gear is limited by adjustable contact with a spring fixed on the main frame. The steering column provided with a hand wheel is attached to the worm gear through an intermediary universal joint.

In the drawings, Figure 1 is a diagrammatic side elevation of a tractor having this invention applied thereto. Fig. 2 is a fragmentary detail illustrating the application of this invention to the turntable of a tractor pilot wheel. Fig. 3 is a detail in vertical cross section on the line 2—2 of the same. Fig. 4 is a side elevation of the same.

In detail, the construction consists of the concentric ring 1 having the inturned flange 2 forming a part thereof, the whole being fixed between the side beams $x$ of the tractor main frame, of which it becomes a fixed part and will hereinafter be referred to as the fixed ring.

The second ring consisting of the concentric ring 3 having the inturned flange 4 forming a part thereof, will hereinafter be referred to as the rotatable ring. The assemblage of the fixed and the rotatable ring forms an annular ball race for the interposed free rolling balls 5 adapted to transmit the weight on the tractor main frame to the pilot wheel and reduce the friction incident to steering the latter. These rings are held in proper relation to each other by the interposed balls under normal circumstances, and by the brackets 6 fixed to the rotatable ring and overhanging the flange of the fixed ring. Under certain conditions of travel, such as crossing ditches or the like, when the weight might be removed from the pilot wheel, these brackets prevent it from dropping out of assemblage.

The gear segment 7 has the gear teeth 8 formed in its periphery which is concentric with the rotatable ring to which it is fixed by the brackets 9 bolted to the ring.

The worm gear 10 enmeshed with the segment is journaled in the bracket 11 which is pivoted on the pins 12 fixed in the brackets 13 bolted to the tractor main frame. The swing of the bracket 11 on the pivot 12 is limited by the scroll spring 14 bolted to the main frame, its free end bearing against the head of the bolt 15 threaded into the boss 16 formed on the bracket 11, and is locked by the jam nut 17.

Rotation is transmitted to the shaft 18 of the worm from the steering column 19 through the interposed universal joint 20. The steering column 19 is provided with the steering wheel 20 located convenient to the operator. Power steering is easily accomplished by interposing suitable gearing between the prime mover and the steering column 19.

Inasmuch as it is impracticable in this class of machinery to preserve that precise pitch alinement necessary to the proper working of a worm gear, it is therefore a substantial improvement to introduce a compensating element where concentric alinement of the turntable is liable to be disturbed by fundamental inaccuracies, subsequent wear or sudden shocks incident to road contact of the pilot wheel. The resilient pressure of the spring 14 preserves absolute engagement of the worm and the segment except in those rare instances when a sudden twist of the pilot wheel sufficient to wreck the steering gear occurs; in which event the sudden shock would thrust the worm out of engagement against the pressure of the spring 14, which would immediately return it to engagement after the shock. This construction saves the entire steering mechanism from any strains greater than those equal to the power of the compensating spring.

Among the primary advantages of the direct application of the worm and gear engagement between the pilot wheel and the steering column is the absolute locking of the pilot wheel in the desired position, due to the irreversibility of the action between the driver and the driven elements of the worm gear. The secondary advantages are the elimination of reducing gears and other complications, the economy in manufacture due to the lack of necessary precision in construction and assembling, the absence of many wearing parts and their cost of maintenance, etc.

Having thus described this invention, what is claimed and desired to secure by Letters Patent is:

1. A steering gear for tractors comprising a fixed ring on the main frame, a pilot wheel mounted on a rotatable ring, free rollers interposed between the fixed and rotatable rings, a gear segment fixed on the rotatable ring, a bracket pivoted on the fixed ring, a worm mounted in said bracket and adapted to engage the segment, the axis of said worm being parallel with the pivot on said bracket, and means for rotating said worm gear.

2. A steering gear for tractors comprising a fixed ring, a pilot wheel on a rotatable ring, a segment fixed on the rotatable ring, a bracket, a pivot connecting said bracket with said fixed ring, a worm mounted in said bracket and adapted to engage said segment, the axis of said worm extending parallel with said pivot, a coöperating spring mounted on the fixed ring and bearing against said bracket, and means for rotating the worm gear.

3. A steering gear for brackets comprising a fixed ring, a pilot wheel mounted on a rotatable wheel, free rollers interposed between said rings, a segment fixed to the rotatable ring, a bracket, a pivot connecting said bracket with said fixed ring, a worm mounted in said bracket and held in resilient engagement with said segment, the axis of said worm extending parallel to said pivot, and means to rotate said worm.

4. A steering gear for tractors comprising a pilot wheel mounted on a ring rotatable in the tractor frame; a segment fixed on the rotatable ring; a worm gear mounted in a bracket, pivoted on the tractor frame; a scroll spring fixed to the tractor frame and bearing against the mounting of the worm gear.

5. A steering gear for tractors comprising a pilot wheel mounted on a ring rotatable in the tractor frame; a segment fixed on the rotatable ring, a worm gear mounted in a bracket pivoted on the tractor frame, a spring fixed to the tractor frame and bearing against the mounting of the worm gear, and means for regulating the tension of said spring.

6. A steering gear for tractors comprising a pilot wheel mounted on a ring rotatable in the tractor frame, a segment fixed on the rotatable ring, a bracket, a pivot connecting said bracket with the tractor frame, a worm mounted in said bracket, the axis of said worm being parallel with the pivot of said bracket, means for yieldingly holding said worm in mesh with said segment, and means for regulating pressure of said holding means.

7. A steering gear for tractors comprising a pilot wheel mounted on a ring rotatable in the tractor frame, a segment fixed on the rotatable ring, a bracket, a pivot connecting said bracket with the tractor frame, a worm mounted in said bracket, the axis of said worm being parallel with the pivot of said bracket, means for yieldingly holding said worm in mesh with said segment, means for regulating pressure of said holding means, a spring mounted on the fixed ring and bearing against the top of said bracket, and means for rotating said worm.

CLARENCE L. BEST.

Witnesses:
BALDWIN VALE,
EDW. F. SULLIVAN.